United States Patent [19]

Sano

[11] Patent Number: 4,927,660
[45] Date of Patent: May 22, 1990

[54] MANUFACTURING PROCESS OF PACKED FAST-COOKING RICE

[76] Inventor: Joji Sano, No. 6-31, Rokkakubashi 6-chome, Kanagawa-ku, Yokohama-shi, Kanagawa-ken, Japan

[21] Appl. No.: 271,209

[22] Filed: Nov. 10, 1988

[30] Foreign Application Priority Data

Nov. 11, 1987 [JP] Japan .................. 62-283167

[51] Int. Cl.⁵ ........................... A23L 1/182
[52] U.S. Cl. ................... 426/618; 426/404; 426/506; 426/507; 426/508
[58] Field of Search ........... 426/618, 461, 462, 404, 426/506, 507, 508

[56] References Cited

U.S. PATENT DOCUMENTS

| | | | |
|---|---|---|---|
| 2,890,957 | 6/1959 | Seltzer | 426/461 |
| 2,944,904 | 7/1960 | Seltzer | 426/461 |
| 3,083,102 | 3/1963 | Carcassonne-Leduc | 426/461 |
| 3,692,533 | 9/1972 | Huber | 99/80 |
| 3,989,855 | 11/1976 | Jones | 426/444 |
| 4,614,660 | 9/1986 | Weibye | 426/461 |

FOREIGN PATENT DOCUMENTS 0106260  6/1984  Japan .................. 426/618
0130156  7/1984  Japan .................. 426/618
0143656 12/1987  Japan .

OTHER PUBLICATIONS

Huxsoll et al., "Microwaves for Quick-Cooking Rice", 5/68, vol. 13, #5, Cereal Science Today, pp. 203–206.
Mombavev et al., Joy of Cooking, 1975, pp. 206, 207, 210, 211 and 288–289.

*Primary Examiner*—Donald E. Czaja
*Assistant Examiner*—Evan Federman
*Attorney, Agent, or Firm*—Armstrong, Nikaido, Marmelstein, Kubovcik & Murray

[57] ABSTRACT

A manufacturing process for preparing packaged fast-cooking rice prepared by a process wherein raw material rice after being washed and soaked in water is heated to become gelatinized rice having a water absorptive property, and the resultant hot gelatinized rice is impregnated with an additive liquid so that swelled rice grains having non-sticking properties are produced. A predetermined amount of the produced rice is packed in an air evacuated package. The product rice can be cooked in an ordinary manner in a short time. By changing the additive liquid, rice containing a preservative or a seasoning can be obtained.

17 Claims, 1 Drawing Sheet

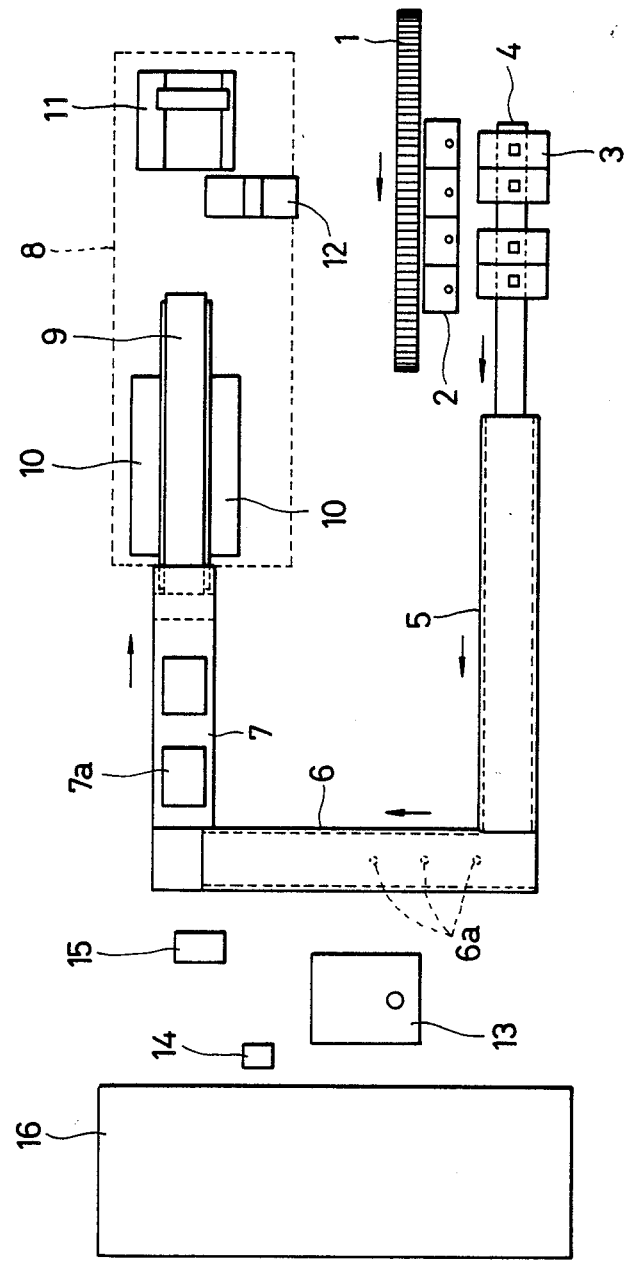

MANUFACTURING PROCESS OF PACKED FAST-COOKING RICE

BACKGROUND OF THE INVENTION

The present invention relates to a process for making a packaged fast-cooking rice.

A conventional manufacturing process for making a packaged rice includes freeze-drying rice which is then cooked by the consumer by adding hot water. In the free-dried process rice is washed with water to remove bran, and a predetermined amount of water is added to the washed rice. The mixture is heated to produce gelatinized cooked rice, and in order to remove pasty materials such as dextrin, and to separate cooked grains from each other the cooked rice is subjected to large water flows and the pasty materials are washed away. Then a mass of wet grains of rice is subjected to a freeze-drying treatment, and the resultant freeze-dried (FD) rice is packed under vacuum in a package. In a second process, instant or quick-cooking rice is manufactured to produce a retort-pouch rice which is obtained by heating raw material washed rice at high temperatures under pressure.

The conventional FD rice manufacturing method is defective in that dextrin and other nutritious ingredients of rice are washed away in the treating procedure for separating the cooked grains of the rice from each other. When cooked by the consumer, such rice has a reduced viscoflexibility, umami (palatable taste), texture and lucidness or gloss as compared with ordinary cooked rice. The drying step in this method is inevitable, as are long drying periods requiring the use of an uneconomical drying apparatus. On the other hand, the method of manufacturing the retort-pouch rice requires especially high temperature heating under pressure which requires using an expensive retort apparatus. In addition, cracking and thermal decomposition of the rice grains occurs and the nutrient value, taste, flavor and lucidness of the cooked rice is reduced.

OBJECTS AND SUMMARY OF THE INVENTION

It is the object of the present invention to provide a manufacturing process for preparing packaged fast-cooking rice which overcomes the defects of the above-mentioned conventional manufacturing methods.

It is another object of the present invention to provide a manufacturing process for preparing packaged fast-cooking rice in which the paste material, or water soluble ingredients, are not washed away and a drying procedure for drying wet rice at a high temperature is abolished, so that on cooking the packaged fast-cooking rice the rice retains the original ingredients of the original raw material rice and retains substantially the same viscoflexibility, good taste, flavor and lucidness as ordinary cooked rice, and the product can be easily and economically preserved for a long time.

To achieve the above objects, the present invention provides a manufacturing process for preparing packaged fast- of quick-cooking rice, which is characterized in that the raw material or original rice is washed to remove bran therefrom and is soaked in water for a predetermined time. Then the water is removed and a predetermined amount of the washed rice is subjected to a heating treatment so that $\beta$-starch of the raw material rice is changed into $\alpha$-starch and at the same time the gelatinized rice grains may have a water absorptivity, and the resultant grains of rice are impregnated with an additive liquid so that swelled grains of rice in a loose non-sticking condition are obtained. Thereafter a mass of the resultant grain is packaged by sealing the rice in an air-evacuated package.

In the process, a small amount of barley may be mixed with the raw material rice. In greater detail, the barley is composed of milled grains of unpressed or pressed barley, and the rice/barley mixture is washed in water and soaked in water for a desired time, and is then heated in a manner as described above.

Also, any desired amount of subsidiary raw material, such as beans, vegetables, etc. may be mixed with the raw material rice or a mixture of the raw material rice and barley.

The heating treatment for gelatinizing the raw material rice and making the same water absorptive is carried out by steam heating, microwave heating, infrared heating and far infrared heating.

The additive liquid may be water, alcohol, an alcohol aqueous solution or a seasoning liquid or a mixture thereof. The additive liquid is added to the rice either without or with the barley and/or the subsidiary raw material. When the alcohol or alcohol aqueous solution is impregnated in the raw material rice, the final product, fast-cooking rice, can be preserved for a long time, and when cooked in water by the consumer the alcohol contained therein is evaporated and there is obtained ordinary cooked rice in which the alcohol and its odor are removed. In addition, when seasoning liquid is impregnated in the rice, the resultant final product can be seasoned with desired seasonings.

During the impregnation of the additive liquid in the heated cooked rice, the additive liquid can serve to swell the grains of the cooked rice and at the same time to cool the heated cooked rice. In this occasion, cooling air or warm air below 40° C. is blown against the cooked rice grains for accelerating cooling of the heated rice.

BRIEF DESCRIPTION OF THE DRAWING

The present invention is more fully understood from the detailed description given hereinbelow and by the accompanying drawing which is presented for illustration purposes only. The drawing is a schematic plan view of an apparatus for carrying out the present invention.

DETAILED DESCRIPTION OF THE INVENTION

In a first step, polished rice in an amount of 10 Kg, for instance, as a raw material rice, is washed with water to remove bran, and is then soaked in water for a desired period of time, for instance, for one to two hours. Thereafter, water is removed from the rice and the rice is transferred to a perforated vessel such as a bamboo basket, so that excessive water drains from the rice. The rice, containing absorbed water, in the basket is heated by steam so that the raw material rice may be gelatinized. In other words, the $\beta$-starch of the rice is changed into $\alpha$-starch, and at the same time the steamed rice acquires water absorptivity properties. The resultant steamed rice is impregnated with an additive liquid such as 2000 g of water or 2000 g of an alcohol aqueous solution in which 500 g of pure alcohol is dissolved in 1500 g of water. By spraying the rice the additive liquid is fully and uniformly absorbed in the grains of the steamed rice. The additive liquids and the porous steamed rice grains produce an unsaturated condition, and consequently all of the additive liquid, such as water or alcohol, can be absorbed quickly by the rice. It is to be understood, of course, that water and alcohol may be absorbed therein one after another by separate applications.

By the forgoing impregnation treatment with an additive liquid such as water or an alcohol aqueous solution, the steamed rice grains swell to become swelled rice grains and the surface binding property of the rice grains is lost. Thus, large-sized rice grains having a good appearance are obtained in a loose non-sticky condition. Simultaneously, with the impregnation treatment, the steamed rice is cooled by the additive liquid. Consequently, this treatment prevents the inconvenience of washing away, with water, soluble proteins, carbohydrates, vitamins, inorganic ingredients or other nutrients which is required when the cooked rice is subject to a large water flow for removing the binding property of the grains as is carried out by conventional methods discussed above. The instant method is such that the viscoflexibility, umami (palatable taste), and nutrient ingredients possessed by the raw material rice are maintained, resulting in gelatinized rice grains having substantially their original viscoflexibility, delicious taste, nutritive value and gloss.

In order to accelerate the cooling of the steam swelled rice grains, it is preferable to blow cool air, or air at room temperature, or warm air at a temperature not causing thermal decomposition of the rice, preferable below 40° C., against the rice grains for about 2-30 hours.

When the additive liquid used in the impregnation step contains alcohol, the alcohol evaporates from the surface of the rice grain and thereby latent heat is taken away accelerating the cooling effect, and at the same time the alcohol serves to solidify pasty materials such as dextrin adhering to the surfaces of the rice grains preventing the same from being blown or washed away and also preventing the grain from binding to each other.

The term "alcohol" means ethyl alcohol including chemical processed, refined or pure alcohol and other alcohol aqueous solutions containing any desired concentration range. The term "alcohol" also includes any kind of fermented alcohol such as whisky, wine, sake (Japanese wine), etc. The alcohol aqueous solution contains at least 0.5% of alcohol prepared by adding water to any kind of alcohol product discussed above. In general, it is sufficient to use an alcohol aqueous solution containing a small percentage of alcohol. Of course, an alcohol aqueous solution containing a higher alcohol content can be used, but it is preferable, from an economic view point, to limit the upper content of alcohol to about 30%.

The resultant steamed rice impregnated with an additive liquid such as water or alcohol is treated as follows: a predetermined amount of the rice is put in a package such as a polyethylene or other synthetically made bag, and is hermetically sealed under a vacuum. Thus, there is obtained a packaged fast-cooking rice. When required, a deoxidant, such as butylated hydroxy anisol (BHA), butylated hydroxy toluene, etc., is put in the package prior to hermetically sealing the package.

The moisture content of the swelled rice grains sealed in the package is about 40%, for instance, and these grains are large sized and glossy having a good appearance. In addition, when the swelled grains contain alcohol, the grains are preserved for a long time as the growth of the anaerobic bacteria, especially the growth of heat resistant spores is restrained by the sterilization effect of the alcohol, and a good quality rice can be maintained during storage of the packaged products as there is no generation of gas caused by the growth of bacteria. Thus, in this embodiment, there is obtained 14.5 Kg of steamed swelled rice as a result of impregnating 10 Kg of raw material rice with 2000 g of additive liquid.

A seasoned fast-cooking rice can be obtained by using a seasoning liquid instead of water or an alcohol solution as the additive liquid. Seasoning liquids include fermented liquid seasonings such as soy, vinegar, etc., a synthetic seasoning prepared by dissolving in water a desired combination of salt, sugar, soy, vinegar, chemical seasonings, such as monosodium glutamate, sodium 5'-inosinate, etc., spices, and flavor or essential oils, and a soup stock prepared by adding any kind of foodstuff to boiling water such as katsuo bushi (dried bonito), meats, tangle, etc., and extracting palatable ingredients therefrom. By adding at least one kind of seasoning mentioned above to the steamed rice, there is obtained a seasoned rice comprising a mass of swelled grains. This composition is packaged in air tight containers as described above. In this case, the seasoning liquid and a desired amount of alcohol may be used for impregnating seasoning into the steamed rice in order to make a seasoned product which can be preserved for a long time.

The impregnation treatment, i.e., the addition of additive liquid into steamed rice, can also be carried out even after the temperature of the steamed hot rice is lowered.

In the above description of the invention gelatinized rice having water absorptivity has been obtained by steaming the washed rice after soaking the rice in water. However, instead of heating with steam, the washed rice may also be heated by microwaves using an electronic apparatus, or by infrared radiation or far infrared radiation to produce gelatinized rice. Such heating treatments cause the gelatinized rice to have a lower moisture content than the gelatinized rice obtained by heating with steam, and thus the amount of additive liquid impregnated into the gelatinized rice can be increased to obtain larger swelled rice grains.

In the case where the alcohol is used as an additive liquid, the addition rate of the additive liquid added to the raw material is about 0.5 to 30% wt. % which, in general, is preferable from an economical point of view.

As is clear from the above description the present inventive method lies in the fact that raw material rice containing water is heated to a gelatinized rice having a water absorptivity property, and then the resulting gelatinized rice is subjected to the impregnation treatment with the additive liquid, so that swelled gelatinized rice grains are obtained.

The attached drawing shows a plan view of a manufacturing apparatus which can be used for carrying out the present invention.

Numeral 1 denotes a conveyor for feeding raw material rice, for instance, a batch containing 10 Kg of either white rice or brown rice, or a mixture thereof, one after another, and numeral 2 denotes a row of rice washers of the water jet type which are disposed on a side of the conveyor 1, and each batch of rice is charged in each of the rice washers, and the raw material rice is washed to remove bran. The washed rice in each rice washer is transferred to each of a row of soaking tanks 3 disposed to be opposite to each of the row of the rice washers 2 through delivery pipes (not shown) and by the aid of a water jet flow. The rice is soaked therein for about 30 minutes in the summer season, and for about 2 hours in the winter season. Thereafter, water in each tank 3 is removed and after the water is drained from the tank, each batch of the rice in each tank is dropped to a conveyor 4 and a row of each rice batch is moved to the interior of a tunnel-shaped steamer 5, and heated with steam as it is being moved forward through the steamer 5. Thus, steamed rice is continuously obtained and is then transferred onto a conveyor provided in a tunnel-shaped additive liquid spray chamber 6 provided in front of and perpendicularly to the steamer 5. The rice is moved forward by the conveyor, and while the steamed rice is being moved forward, an additive liquid such as an aqueous solution containing a desired content of alcohol is sprayed uniformly on the whole of the steamed rice from a row of spray nozzles 6a disposed at regular intervals on a front part of the whole length of a ceiling of spray chamber 6, so that a predetermined ratio of the alcohol aqueous solution, in relation to the amount of the steamed rice, is impregnated into the steamed rice. The resultant swelled steamed rice grains containing the predetermined amount of alcohol aqueous solution is dropped on a conveyor in a tunnel-shaped cooling chamber 7 provided in front of and perpendicular to the conveyor in the liquid spray chamber 6. The swelled rice is further moved forward by the conveyor. During movement thereof, the swelled rice grains are blown with cooling air from plural cooling fans 7a disposed longitudinally on a ceiling of the tunnel-shaped cooling chamber 7 for uniformly blowing cool air or warm air against the swelled rice. In this case, it is preferable to use a perforated conveyor such as a net conveyor having good ventilation properties. The outer end portion of the cooling chamber 7 is connected to a working clean room 8 as shown by surrounding dotted lines in the drawing. In clean room 8 there is a working conveyor 9 connected to the conveyor in the cooling chamber 7, and the alcohol containing and swelled rice grains are cooled to room temperature, or approximately thereto, are transferred onto conveyor 9. While being moved on conveyor 9, by utilizing working tables 10 located on either side of conveyor 9 a predetermined amount of the swelled rice is weighed and, for instance, 1 Kg thereof is put into a package for holding 1 Kg of the rice, by manual operation, and vacuum packing is carried out by a vacuum packaging apparatus 11 installed near the outer end of conveyor 9. The manual operation may be substituted by a mechanical operation. It is preferable that rice packages are conveyed through metal detector 12. In addition, prior to the vacuum packaging thereof, it is preferable to put an oxygen scavenger or absorber in the rice package. An oxygen scavenger, for instance, containing a combination of iron powder and common salt catalyzer sold in small gas permeable packages by Mitsubishi Gas Chemistry Kabushiki Kaisha of Japan under the trade name "AGELESS" can be used, but any other desirable oxygen scavenger may be used.

Referring to the drawing, numeral 13, is a boiler connected to the steamer 5, numeral 14 designates a container for a water softener, numeral 15 designates an oil tank, and numeral 16 designates a rice stock room.

Raw material rice, includes non-glutinous rice, but any part of a whole thereof may be replaced by glutinous rice. In the foregoing description the rice has been treated alone, but as desired, the rice can be used as a principal raw material, and about 1–30% of barley can be mixed with the rice, and a mixture thereof is washed in water and soaked in water and water is removed from the mixture and the mixture is subjected to a heating treatment as discussed above. Barley, such as milled unpressed barley or pressed barley may be used.

Furthermore, any kind of a subsidiary raw material can be mixed with the rice or a mixture of the rice and barley for making a packaged fast-cooking rice according to the present invention.

Subsidiary raw materials include, for instance, beans, such as soybeans, red beans, green peas, broad beans, etc., vegetables include such as carrots, radishes, mushrooms, etc.

When using beans, the beans are washed in water and soaked in water for a predetermined time, and thereafter mixed with the rice which has been soaked in water. When using vegetables, the vegetables are washed in water and cut in pieces as desired and then mixed with the rice to be heated. The beans are mixed with the rice or a mixture of the rice and barley in a ratio of about 10–30 wt. % relative to the rice or rice and barley mixture.

Thus, when any subsidiary raw material is mixed with the principal raw material composed of raw material rice or a mixture of raw material rice and barley, the resultant mixture of raw materials is subjected to the heating treatment, and then impregnated with the additive liquid, and then packaged in an air tight package. The method produces various kinds of packaged fast-cooking rice which vary in taste and appearance.

In summary, according to the present invention, the raw material rice is washed with water, and is then soaked in water, and the water is removed from the rice and the rice is heated so as to become gelatinized rice having a water absorptivity and the resultant gelatinized rice is impregnated with an additive liquid. Thereby, a mass of swelled rice grains in a loose non-sticky condition is prepared. Thereafter, a predetermined amount of the swelled rice grain is packaged and sealed in an air tight package to produce a packaged fast-cooking rice. By this method, the foregoing defects of conventional methods for producing FD rice and the retort rice are overcome, and there is easily and economically manufactured a fast-cooking rice of good quality. In addition, the present invention has the advantage that when fast-cooking rice is to be cooked, cooking requires merely adding a predetermined amount of water to a rice cooker, without washing and soaking the rice in water. The rice is cooked in a short time in an ordinary cooking manner and thereby a cooked rice is obtained having almost the same gloss, viscoflexibility, texture and palatable taste as an ordinary cooked rice obtained by cooking raw material rice. Furthermore, when alcohol is impregnated in the hot gelatinized rice grains, solidification of the water-soluble matter present on the surfaces of the rice grains is accelerated, and at the same time, cooling of the hot gelatinized rice can be accelerated. The process of using alcohol as the impregnating additive liquid also sterilizes rice and prevents the germination of spores and the growth of germs which during storage can generate gasses caused by decomposition of the product rice.

Therefore, the products can be stored in a stable and good quality condition.

EXAMPLE 1

A sealed package containing alcohol impregnated rice is opened, and 1 KG thereof, for instance, is placed in a rice boiler without being washed. 880 cc of water is added and then the mixture is heated. The rice is cooked in about 25 minutes. During cooking the alcohol contained in the steamed swelled rice grains is evaporated completely, and there is obtained a cooked rice, free from alcohol and free from the odor of alcohol, which has the same viscoflexibility, delicious taste, texture and gloss as ordinary cooked rice obtained by cooking raw material rice.

I claim:

1. A process for preparing packaged fast-cooking rice, comprising washing raw material rice in water, soaking said washed rice in water, draining water from the rice, heating the rice to gelatinized grains of cooked rice having a water absorptive property, impregnating said gelatinized and water-absorptive grains of rice with an additive liquid to swell the grains of rice causing the grains of rice to separate from each other, and packaging the swelled and separated rice grains in an air evacuated package.

2. A process according to claim 1, wherein the raw material rice is selected from the group consisting of non-glutinous rice, glutinous rice and a mixture thereof.

3. A process according to claim 2, further comprising mixing about 1-30% of barley with the raw material rice prior to the water washing step.

4. A process according to claim 2 further comprising mixing the raw material rice with a subsidiary raw material prior to the heating step.

5. A process according to claim 4, wherein the subsidiary raw material is bean.

6. A process according to claim 5, wherein about 10-40 wt. % of the bean is mixed with said raw material rice.

7. A process according to claim 4, wherein the subsidiary raw material is at least one vegetable.

8. A process according to claim 7 wherein about 10-30% of said at least one vegetable is mixed with said raw material rice.

9. A process according to any one of claims 2-8 and 1, wherein said heating treatment is conducted by steam-heating, microwave heating, infrared or far infrared heating.

10. A process according to claim 1, wherein the additive liquid is at least one liquid selected from the group consisting of water, ethyl alcohol, an ethyl alcohol aqueous solution, and a seasoning liquid.

11. A process according to claim 10, wherein the alcohol aqueous solution contains about 0.5% to 30% alcohol.

12. A process according to claim 10 wherein the seasoning liquid is an aqueous solution selected from the group consisting of fermented seasoning, soup stock containing palatable ingredients extracted from tangle, meats or dried fermented bonito and solutions of water and at least one ingredient selected from the group consisting of salt, sugar, vinegar, soy monosodium glutamate, sodium 5'-inosinate, flavor and essential oils.

13. A process according to claim 3 further comprising mixing the mixture of raw material rice and barley with a subsidiary raw material prior to the heating step.

14. A process according to claim 13 wherein the subsidiary material is bean.

15. A process according to claim 14 wherein about 10-40 wt. % of the bean is mixed with said mixture of raw material rice and barley.

16. A process according to claim 13 wherein the subsidiary raw material is at least one vegetable.

17. A process according to claim 16 wherein about 10-30 wt. % of said at least one vegetable is mixed with the mixture of raw material rice and barley.

* * * * *